(12) United States Patent
Turner

(10) Patent No.: US 6,406,396 B1
(45) Date of Patent: Jun. 18, 2002

(54) LINK CHAIN FOR A CONTINUOUSLY VARIABLE TRANSMISSION

(75) Inventor: Douglas J. Turner, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 9 days.

(21) Appl. No.: 09/739,165

(22) Filed: Dec. 18, 2000

(51) Int. Cl.$^7$ .............................. F16G 1/24; F16G 13/00
(52) U.S. Cl. ...................... 474/242; 474/245; 474/206; 474/213
(58) Field of Search .................. 474/213, 214, 474/242, 245, 206, 207, 240, 202, 208, 212, 237, 244

(56) References Cited

U.S. PATENT DOCUMENTS

| | | | |
|---|---|---|---|
| 4,276,041 A | 6/1981 | Steuer | 474/243 |
| 4,344,761 A | 8/1982 | Steuer | 474/245 |
| 4,500,305 A | 2/1985 | Rattunde | 474/201 |
| 4,504,255 A | 3/1985 | Rattunde | 474/201 |
| 4,547,182 A | 10/1985 | Rattunde | 474/214 |
| 4,710,154 A | 12/1987 | Rattunde | 474/242 |
| 4,813,918 A | 3/1989 | Rattunde et al. | 474/245 |
| 4,927,404 A | 5/1990 | Rattunde | 474/242 |
| 5,427,583 A | 6/1995 | Wolf | 474/206 |
| 6,299,559 B1 * | 10/2001 | Friedmann | 474/245 |

* cited by examiner

*Primary Examiner*—Douglas C. Butler
(74) *Attorney, Agent, or Firm*—Stephen G. Mican

(57) ABSTRACT

An endless loop transmission chain balances the differences in moments and stresses on its inner and outer links. The chain is comprised of a plurality of links that are pivotally connected in stacks and in overlapping series. The links are fashioned with holes perpendicular to the link faces, and the links are either "robust" or "thin". Robust links may be made of material of greater tensile strength, they may be formed by mating at least two thin links, and/or they may be made of thicker material. A plurality of pins serially connects and stacks the links. The pins fit though the holes in each link perpendicular to the link face. Robust and thin links are alternated in stacks in a pattern that balances link tension when the chain is under tension. Fewer links carry the tension between any set of adjacent pins. When it is used in a transmission, this chain has at least 10% higher torque-carrying capacity than the prior art.

10 Claims, 7 Drawing Sheets

LINK CHAIN FOR A CONTINUOUSLY VARIABLE TRANSMISSION

FIELD OF THE INVENTION

The invention relates generally to a link chain for friction pulley transmissions, and more particularly to an endless, flat-link, articulated chain for continuously variable transmissions of the movable cone type.

BACKGROUND OF THE INVENTION

Continuously variable transmissions (CVTs), also known as infinitely variable or step-less transmissions, have long been used in marine, industrial, and automotive applications. In a CVT, regardless of the application, the ratio between the rotational speed of a drive shaft and the rotational speed of a driven shaft may be continuously varied between two predetermined limits, rather than in discrete steps.

In a typical CVT, an endless chain frictionally couples a pair of pulleys, otherwise known as sheaves. One pulley is connected to the drive shaft, and the second pulley is connected to the driven shaft. Links connected by pins comprise the chain. Each pulley is comprised of two opposed cones, also known as disks, which are moveable axially towards or away from each other on both the drive and driven shafts. Generally, one cone is fixed to each shaft and the second cone moves axially on the same shaft relative to the fixed cone. Each chain pin may comprise a pair of rockers that pivot on each other. The two ends of the pin are frictionally coupled to the opposing surfaces of the cones, which load the pins. Axial motion of the moveable cone in a drive pulley or a driven pulley or both places the chain at varying radial positions with respect to the axis of the pulley. This motion varies the transmission speed ratio between a drive shaft and a driven shaft.

For aerospace electrical power generation, a generator must typically be driven at a constant speed to enable the generator to produce constant-frequency electrical power, usually at 400 Hz. A CVT may be used to drive a generator from the output shaft of a gearbox driven by a gas turbine engine of an aircraft. The CVT typically converts the variable engine rotational speed to the constant speed required to drive the generator. As in any aerospace application, one of the challenges lies in maximizing the strength-to-weight ratio of the chain. This helps to maximize the power-to-weight ratio of the CVT.

That is, the transmission chain is required to handle the power demands of the CVT, yet be compact and lightweight. Many prior art chains used endless articulated patterns of flat links, with the links connected by pins. These chains carried torque between the pulleys by means of frictional forces on the ends of the pins; the links transmitted the tension, or force. The torque-carrying capacity of a chain multiplied by the pulley speed equals the power transmitted. However, the link pattern that optimizes the strength-to-weight ratio of the chain is far from obvious.

Many marine and industrial transmission chains are available. These chains are made from standard materials, are relatively low in strength-to-weight ratio, and are not designed for aerospace reliability. In aerospace applications, manufacturers are willing to use higher-quality materials and optimum designs to achieve greater reliability and higher strength-to-weight ratio.

In some prior art chains, stronger, or robust, links are used near the outer edges of the chain. As used throughout herein, the term "robust" refers to a chain link that has the characteristic of being relatively stronger. Robust links may be made in one or more of the following three ways: they may be made of material of greater tensile strength, they may be formed by mating at least two thin links, and/or they may be made of thicker material.

The pattern of robust links repeats every two or three pins in some designs. In some prior art chains, however, certain links see excessive loads because they are segregated from other links. That is, these segregated links do not have sufficient adjacent links or robust links to carry the tension. This lack of support causes the segregated links to carry more than their share of the chain tension, causing higher stress, or tension per unit area, in the segregated link. In addition, certain pins experience higher bending, or twisting forces (hereinafter "moments") leading to higher stresses and premature failure. This will be discussed in more detail hereinbelow.

Examples of prior art chains in which certain links experience excessive loads are found in U.S. Pat. No. 4,547,182 and 4,927,404, both to Rattunde. The chains of these patents attempt to balance the loading of a chain pin to prevent bending and twisting it. This was tried by placing robust links mostly at the edges, or mostly near the center. However, the tension distribution among the links is unequal when strong, or robust, links are used only at the outer or inner edges of the chain.

DISCLOSURE OF THE INVENTION

Accordingly, it is an object of this invention to provide a transmission link chain with improved strength-to-weight ratio.

Another object is to provide a link chain that balances stress and moments on the inner and outer links as well as on the pins.

Still another object is for fewer links to carry the tension between any set of pins, but for the chain, when used in a CVT, to have at least 10% higher torque-carrying capacity (which requires 10% higher tension capacity) than a prior art chain.

Another object is to provide a link chain with sufficient reliability for an aerospace CVT.

A major step in the invention is the recognition that placing robust links throughout the chain in an evenly distributed pattern produces a more equally loaded chain.

According to the invention, an endless loop chain having a central axis comprises a plurality of pins; the chain also comprises a plurality of links, each link further comprising it two faces parallel to the center axis, each link fashioned with two holes perpendicular to the faces, wherein the links are pivotally connected in stacks and in overlapping series by the pins fitted though the holes, and wherein robust and thin links are arranged in the direction perpendicular to the faces, such that robust links are distributed evenly in the direction perpendicular to the axis of the chain. In the present invention, the term "robust" refers to links that may be made in one or more of the following three ways: they may be made of material of greater tensile strength than "thin" links, they may be formed by mating at least two thin links, and/or they may be single links made of thicker material than thin links. According to one aspect of the invention, a pattern that balances link stresses and pin moments as nearly equally as possible uses thin links and robust links that are staggered in a diagonal pattern, stepping from pin to pin, across the chain as follows:

1,1,2,1,2,1,2,1,2,1,2,1,2,1,1 where "1" refers to a thin link and "2" refers to a robust link.

According to a second aspect of the invention, a pattern that balances link stresses and pin moments as nearly equally as possible uses a chain that is sixteen links wide, such that, along a line generally perpendicular to the center axis that zigzags from a first to a second adjacent pin and back, the links are stacked as follows:

1, 2, 2 1, 1, 2, 1, 1, 1, 1, 2, 1, 1, 2, 2, 1 where "1" refers to a thin link and "2" refers to a robust link.

The invention has utility because it increases the tension capability of the CVT chain while reducing its weight, thus increasing the chain's strength-to-weight ratio.

The above and other objects, features, and advantages of this invention will become apparent when the following description is read in conjunction with the accompanying drawings.

DETAILED DESCRIPTION OF THE PREFERRED EMBODIMENTS

Figure 1:
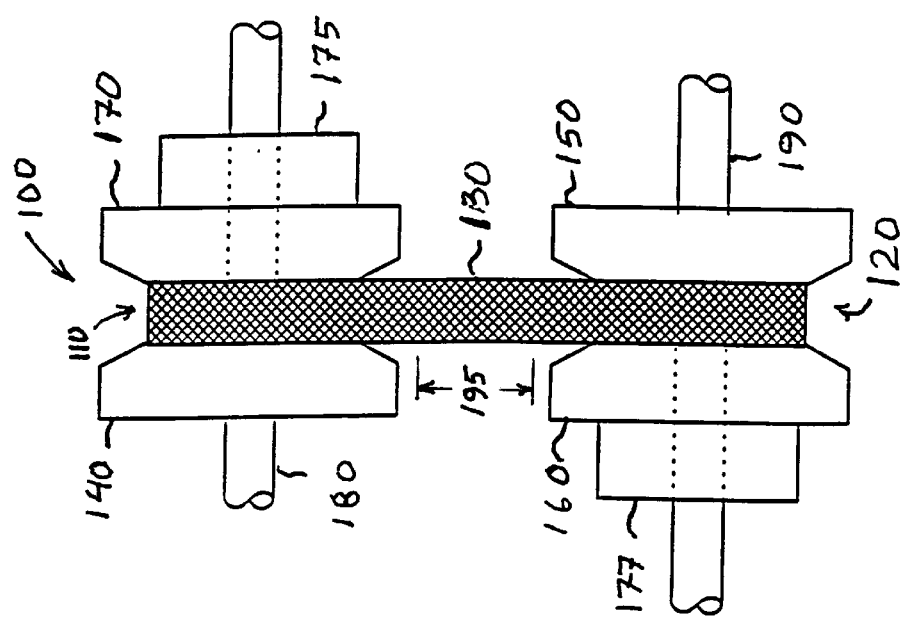
FIG. 1 is a side view of a portion of a CVT including a chain.

Referring to FIG. 1, one embodiment of a CVT 100 is illustrated, including a pair of friction pulleys 110,120 coupled by an endless chain 130. The CVT 100 may incorporate the chain of the present invention as described in detail hereinafter. Each pulley, in turn, is comprised of a fixed cone 140,150 and a moveable cone 160,170. The moveable cone moves axially towards or away from the fixed cone on shafts 180,190. The motion of the cones 160,170, caused by a primary actuator 175 and a secondary actuator 177, places the chain 130 at varying radial positions on the pulleys 110,120. The actuators 175,177 may be hydraulic, mechanical, or electromechanical. This changing radial chain position varies the transmission ratio between the drive shaft 180, which may for example be the output of a gearbox driven by a jet engine, and the driven shaft 190, which may e.g. power an electric generator. Between the two pulleys 110,120 where the chain is "clamped" to the pulleys (i.e., in physical connection with the pulleys), the chain is in an "unclamped space" 195 (i.e., the chain is not in physical contact with the pulleys). The transmission ratio varies without steps, continuously, between two predetermined limits.

Figure 2:
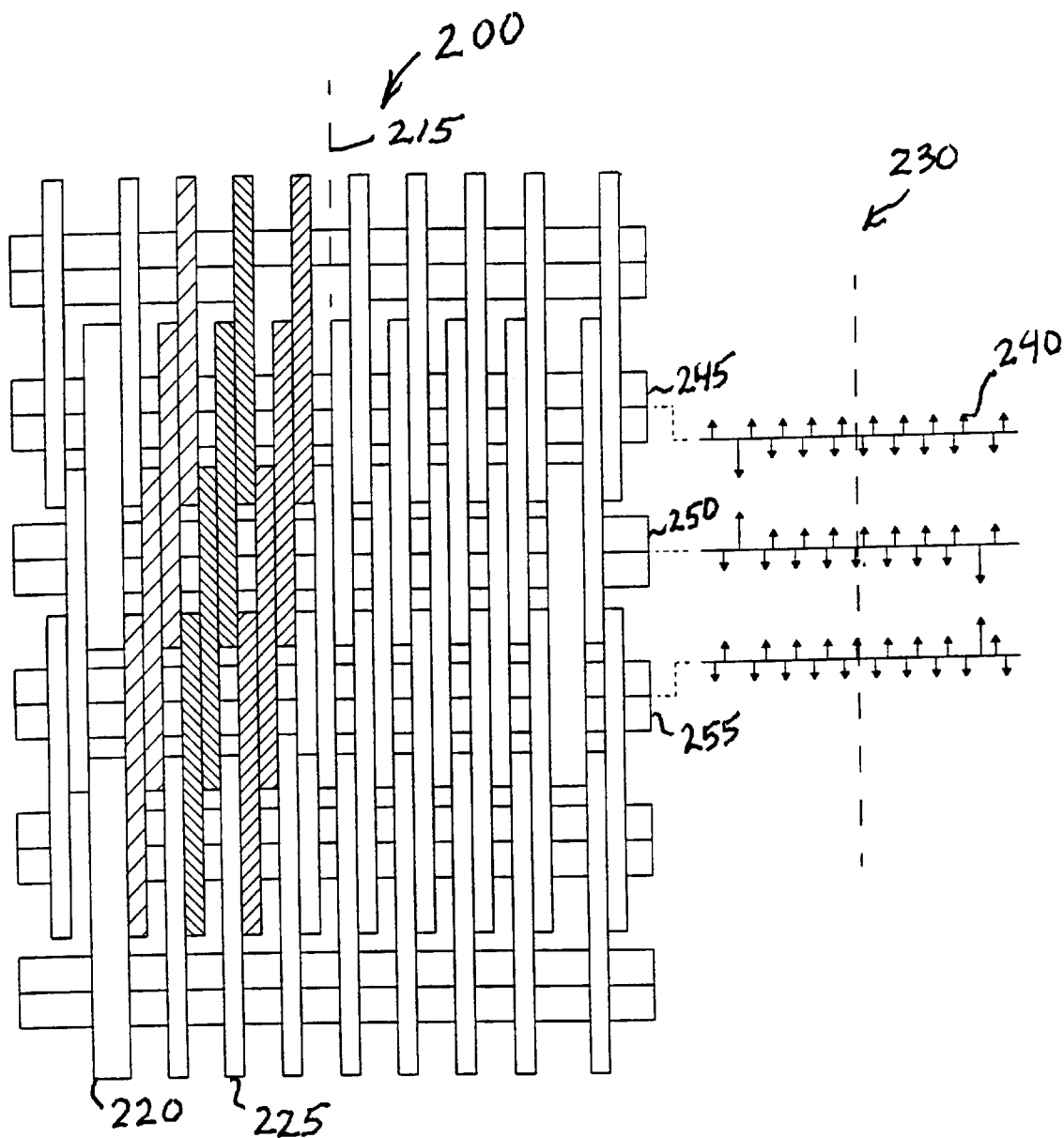
FIG. 2 is an orthographic projection of a prior-art three-link chain as used in a CVT similar to FIG. 1, including a corresponding diagram in which is illustrated the estimated tension vectors for each link on three chain pins.

FIG. 2 represents a prior-art transmission chain 200, known as a three-link arrangement, which is similar to that illustrated in U.S. Pat. Nos. 4,547,182 and 4,927,404, both to Rattunde. This chain may be used in a CVT similar in design to the one shown in FIG. 1. Basically, the chain comprises flat links of varying strength or thickness (varying robustness) and cylindrical pins. If the robust links 220 are each comprised of two adjacent thin links 225 for example, this chain is thirty thin links wide. The links, as shown by the cross-hatching in FIG. 2, are longitudinally staggered, stepping from pin to pin, along the length of the chain. The three varieties of cross-hatching show how the pattern of links repeats. As can be seen in FIG. 2, the pattern of thick and thin links repeats every three pins 245,250,255. Looking closely reveals that ten thin links 225 (or nine thin and one robust link) carry the tension between any set of adjacent pins. Robust links 220 are positioned only near the outer edges of the chain. This structure will be contrasted with the present invention, which is described in detail hereinbelow.

To the right of the chain illustration in FIG. 2 is a diagram 230 of the estimated tension, or force vector, 240 on each of the robust and thin links 220,225 along three successive pins 245,250,255. The tension vectors 240 may be used to determine bending and induced moments on the pins 245, 250,255 when the pins are unclamped, that is, in the space 195 between pulleys shown in FIG. 1. Three successive pins 245,250,255 are used since, as mentioned before, the pattern of the chain 200 repeats every three pins. Since no other external forces act on the chain besides tension along the chain, the links share equal tension stresses due to the relationship $$\sigma = E\epsilon \qquad \text{Eq. 1}$$

where σ is the stress, E is the modulus of elasticity (which is a constant for all links if the same material is used), and e is the strain (which is constant since all thick and thin links 220,225 between adjacent pins stretch together). Because the tension stress is equal among the links, the tension load in each link is proportional to its thickness. This comes from the equation $$\text{tension} = \sigma A \qquad \text{Eq. 2}$$

where A is the cross-sectional area of link. To create free-body diagrams, the tension, or force vector, for each link 220,225 is assumed to react through the center of the link. With the length of the vectors 240 defining the magnitude of tension, a free-body diagram of each pin 245 is calculated and analyzed for pin bending and induced moments when the chain 200 is unclamped in the space 195.

The tension diagram 230 is used to determine pin 245 bending, which tends to flex or bow the pin, and pin moment, which tends to rotate or twist the pin, as follows: To determine bending, the pin is analyzed as two halves, split along the center axis 215 of the chain. The moments are summed (each tension at the corresponding distance) for each pin half about the center axis 215. If the resulting moments are in opposite directions (i.e., the resulting moment on the left side of the pin 245 has a CW rotation and the resulting moment on the right side of the pin has a CCW rotation), the pin tends to flex or bow.

To determine pin moments, again the pin 245 is analyzed as two halves, split at the center axis 215. The moments are summed (each tension at the corresponding distance) for each pin half about the center axis. If the resulting moments are in opposite directions (i.e., the resulting moment on the left side of the pin 245 has a CW rotation and the resulting moment on the right side of the pin has a CCW rotation), and the resulting moments are of equal magnitude, the pin does not have a twisting moment. In all other cases, a pin moment is present.

Figure 3:
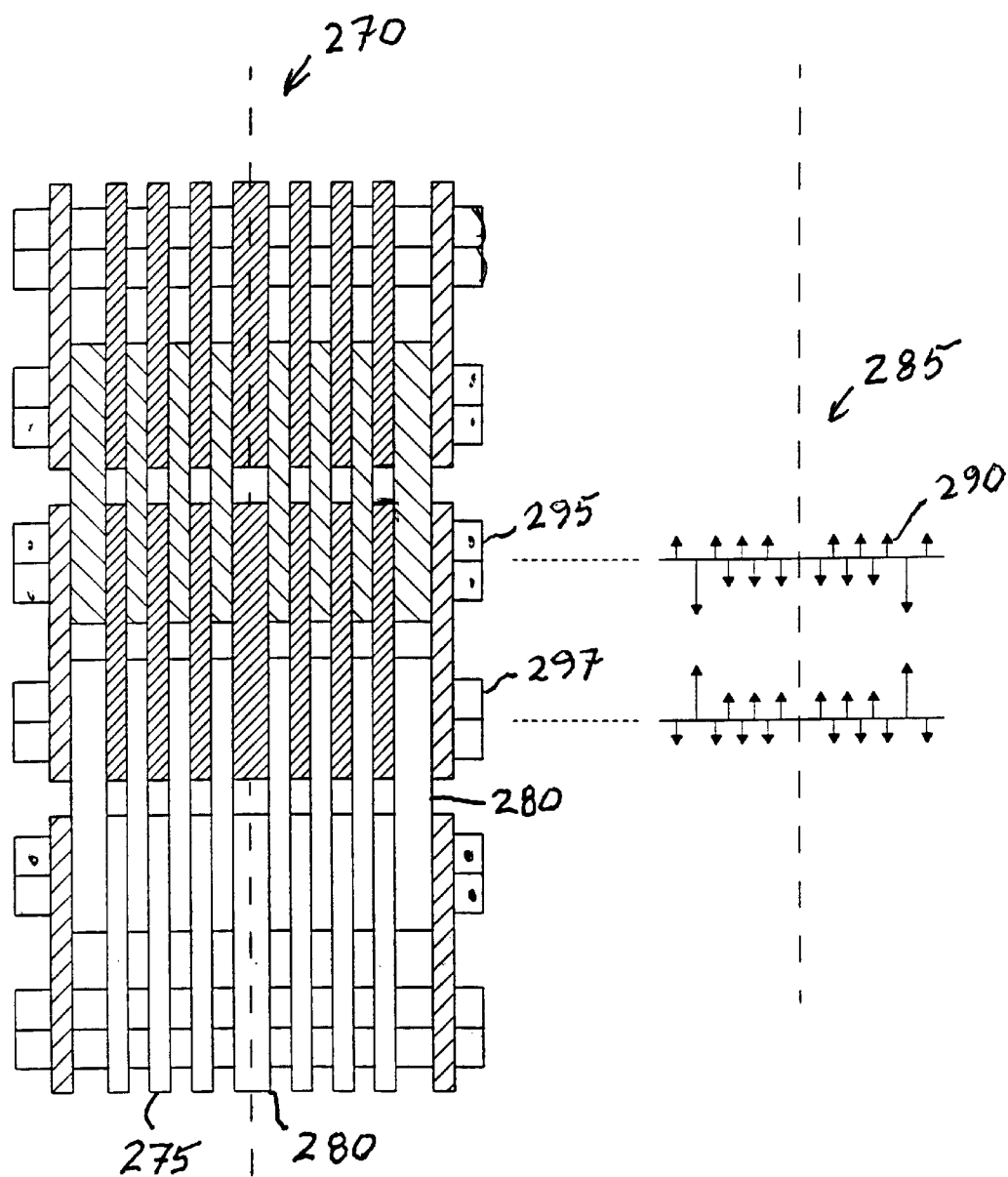
FIG. 3 is an orthographic projection a prior-art alternately staggered chain as used in a CVT similar to FIG. 1, including a corresponding diagram in which is illustrated the estimated tension vectors for each link on two pins.

Referring to FIG. 3, a dual-link, or alternately staggered, chain 270 is shown that is similar to the chain taught in U.S. Pat. No. 4,547,182 and 4,927,404, both to Rattunde. The width of this chain is twenty thin links 275, counting the robust links 280 again as comprising double thin links. As emphasized by the cross-hatching, the links are staggered like bricks in a wall. Again, this structure will be contrasted with the present invention. Robust links 280 are placed in the outer edges and in the center. To the right of the chain illustration is shown a diagram 285 of an estimated tension vector 290 for each of the links along two successive pins 295,297. Two successive pins are used because the pattern of the chain repeats every two pins. As stated before, the tension vectors 290 may be used to determine pin bending and induced moments on the pin 295 when the chain 270 is unclamped in the space 195 between the drive and driven pulleys of a CVT.

Figure 4:
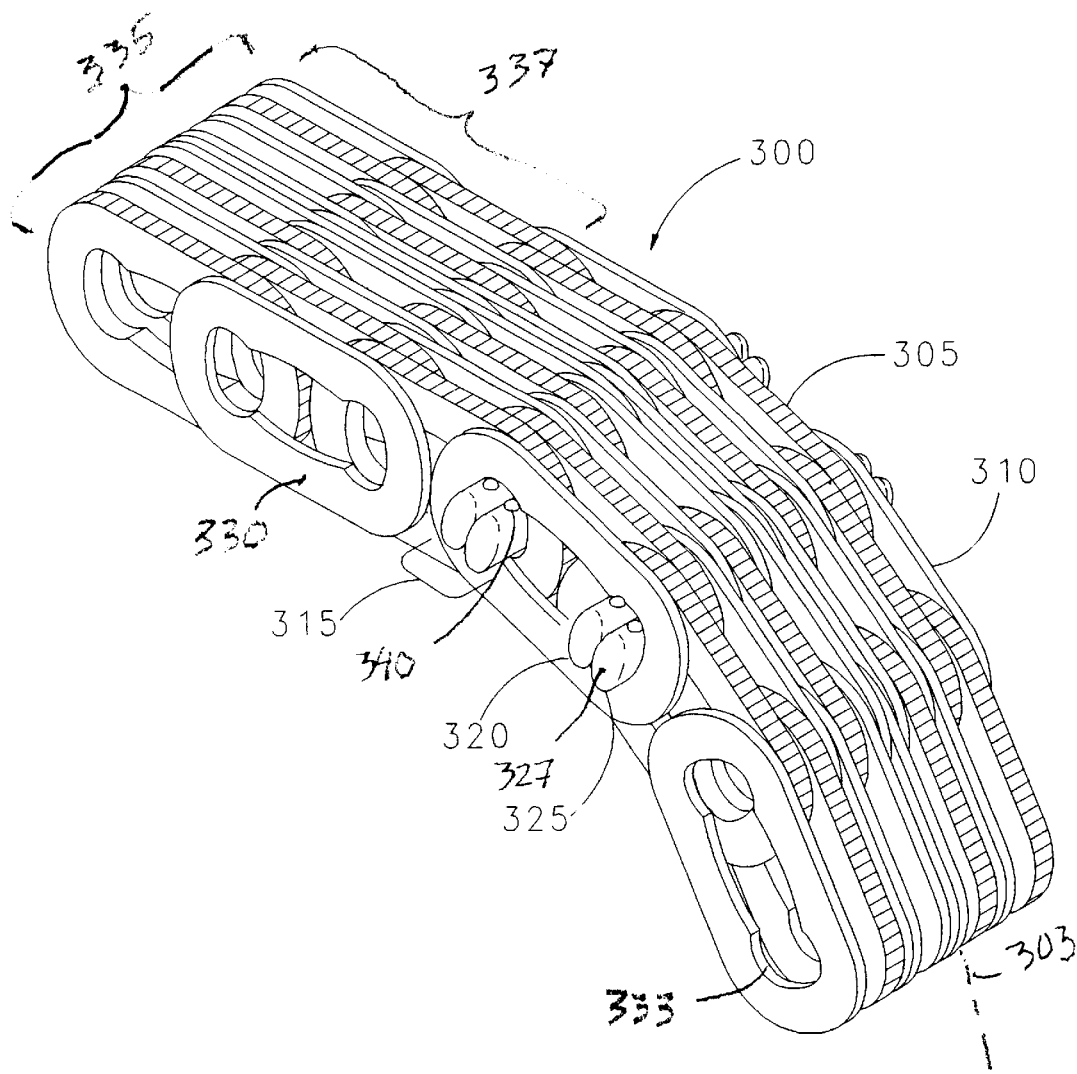
FIG. 4 is an isometric view of one embodiment of a chain according to the present invention, as used in the CVT of FIG. 1.

In FIG. 4 is illustrated isometrically a portion of a staggered, dual-link, chain 300 that is one embodiment of the present invention. This chain is an improvement on staggered dual-link chain designs such as the one illustrated in FIG. 3. The chain 300 is an endless loop chain having a center axis 303. The chain, typically made of hardened steel, comprises elongated pins 315 and flat links 305,310. Each pin preferably further comprises two rockers 320,325. A weld spot 340 is added to the pins 315 at each end to prevent them from sliding out. Each pin has two ends that terminate in pressure reception areas 327, which are angled surfaces to match the corresponding surfaces of the pulleys 110,120 and thus reduce wear. Typically, the angle is in the range of approximately seven to approximately fifteen degrees to the center axis. Thin links 310 and robust links 305 are connected by the pins 315. In the present invention and as construed throughout, including the claims, the term "robust" refers to links that may be made in any one or more of the following three ways: they may be made of material of greater tensile strength than "thin" links, they may be formed by mating at least two thin links, or they may be single links made of thicker material than thin links. Each link 305,310 comprises two faces 330 parallel to the center axis 303, and each link 305,310 is fashioned with two spaced holes 333, preferably elliptical, having axes perpendicular to the faces 330. The links 305,310 are pivotally connected in stacks 335 and in overlapping series 337 by the pins 315 fitted though the holes 333. The pins extend past the links so that the ends can connect frictionally to the pulleys 110,120.

Figure 5:
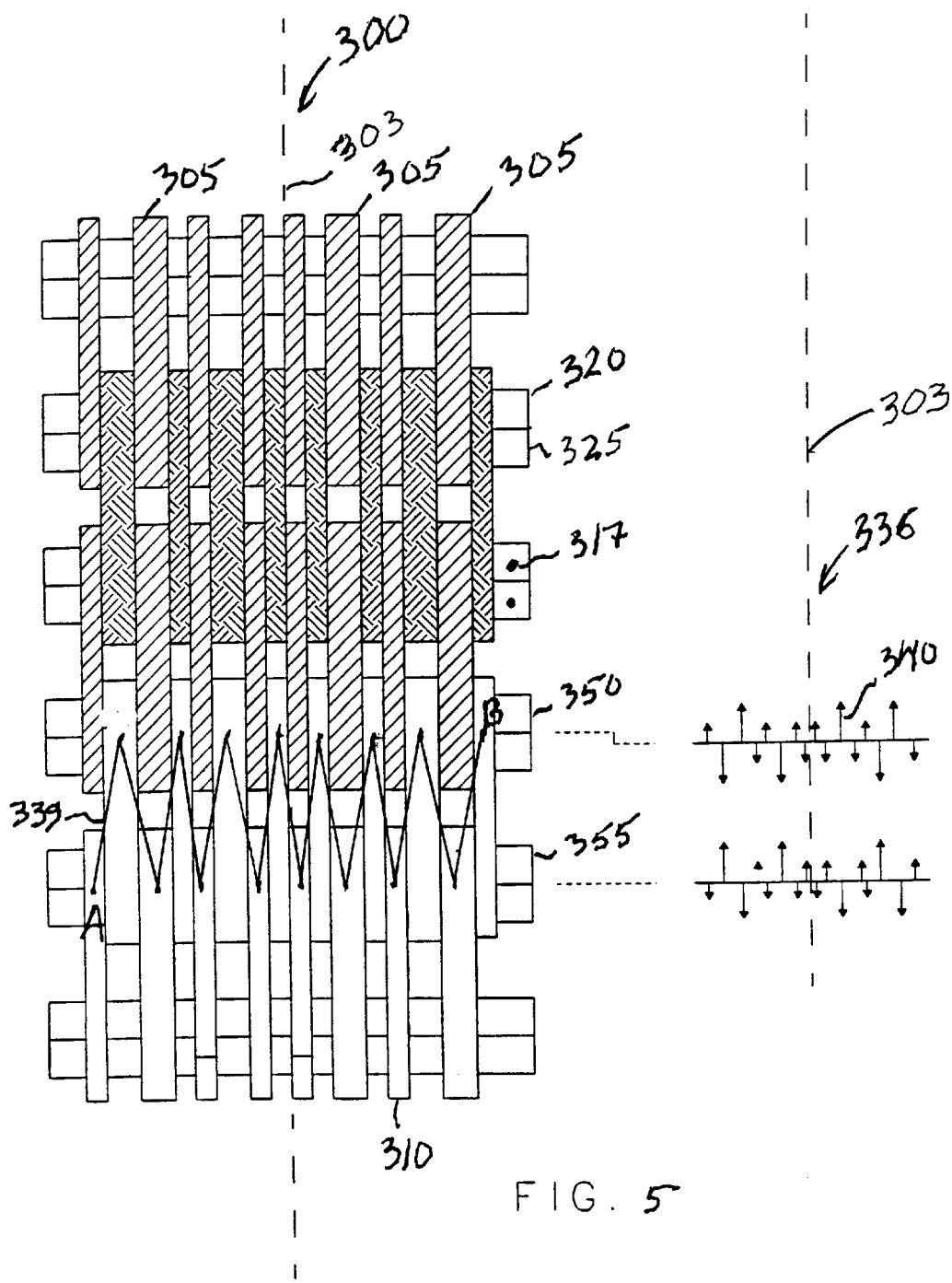
FIG. 5 is an orthographic projection of a section of the chain of FIG. 4, including a corresponding diagram in which is illustrated the estimated tension vectors for each link on two chain pins.

Referring to FIG. 5, the chain 300 of FIG. 4 in orthographic projection, is sixteen links wide, such that, along a line 339 generally perpendicular to the center axis 303 that zigzags from a first pin to a second adjacent pin and so forth as shown in FIG. 5, the links 305,310 are stacked as follows:
1, 2, 21, 1, 2, 1, 1, 1, 1, 2, 1, 1, 2, 2, 1
where "1" refers to a thin link 310 and "2" refers to a robust link 305 that for simplicity is illustrated as double the thickness of the thin link, although it need not be limited as such. Instead, the symbol "2" refers to robust links that, as stated before, may be made in any one or more of the following three ways: they may be made of material of greater tensile strength than the thin links, that may be formed by mating at least two thin links, and/or they may be single links made of thicker material than the thin links.

In accordance with the present invention, the robust links 305 are distributed throughout the chain, as opposed to restricting their use to the center and near the outer edges as in the prior art illustrated in FIG. 3. To the right of FIG. 5 shown a diagram 336. A force vector 340 is shown for each of the thin and robust links 310,305 along two successive pins 350,355 when the chain is in the unclamped space 195 between the pulleys 110,120. The diagram 336 is used to determine pin 350 bending, which tends to flex or bow the pin, and pin moment, which tends to rotate or twist the pin, in the following manner: To determine bending, the pins are analyzed as two halves, split along the center axis 303 of the chain 300. The moments are summed (each tension at the corresponding distance) for each pin half about the center axis 303. If the resulting moments are in opposite directions (i.e., the resulting moment on the left side of the pin 320 has a CW rotation and the resulting moment on the right side of the pin has a CCW rotation), the pin tends to flex or bow.

To determine pin moments, again the pin 320 is analyzed as two halves, split at the center axis 303. The moments are summed (each tension at the corresponding distance) for each pin half about the center axis 303. If the resulting moments are in opposite directions (i.e., the resulting moment on the left side of the pin 320 has a CW rotation and the resulting moment on the right side of the pin has a CCW rotation), and the resulting moments are of equal magnitude, the pin does not have a twisting moment. In all other cases, a pin moment is present.

Using this analysis and as can be seen in FIG. 5, the chain 300 shows relatively small pin bending or pin moment (twisting). The moment on the pin 320 is comparable to the prior art chain shown in FIG. 3. Pin bending of the chain 300 is reduced, however, as compared to the prior art chain 270.

Figure 6:
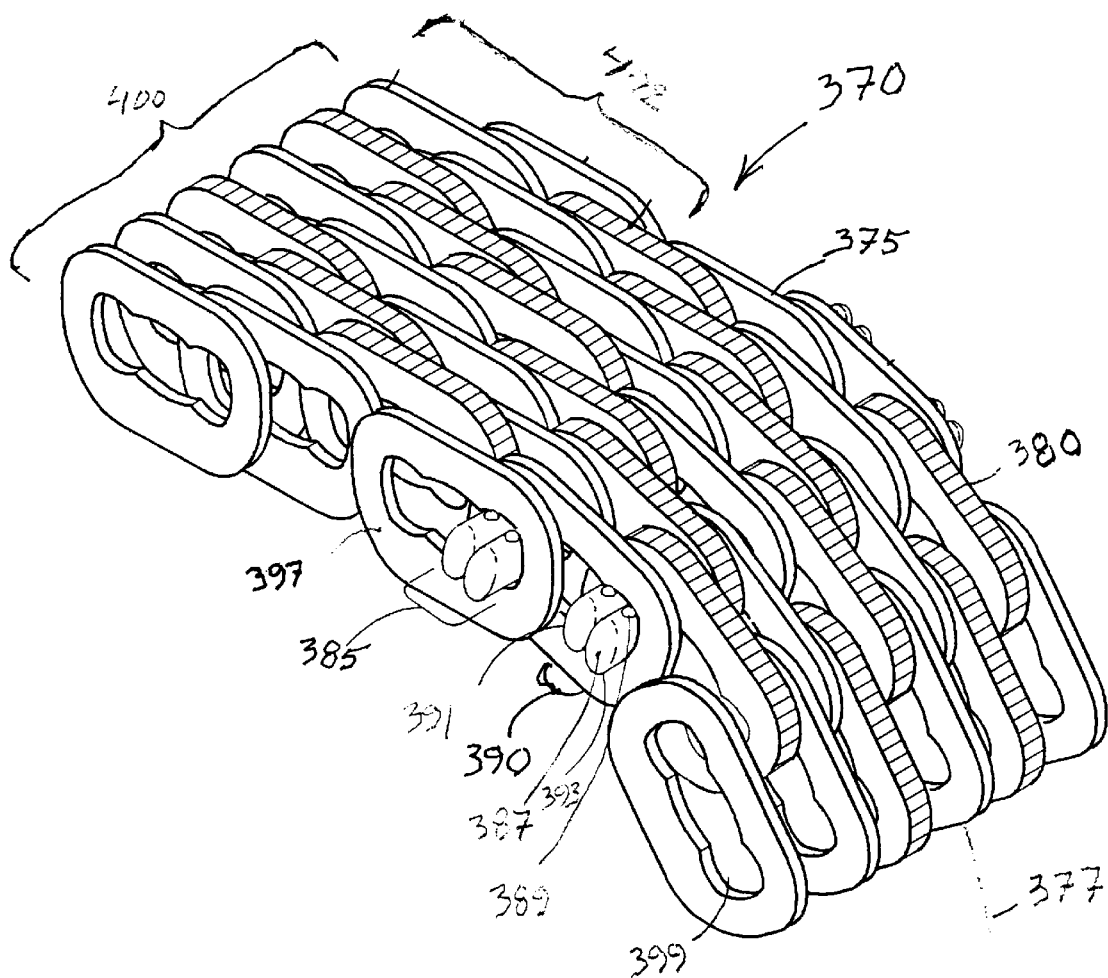
FIG. 6 is an isometric view of a second embodiment of a chain according to the invention, as used in the CVT of FIG. 1.

An isometric view of a portion of a second and preferred embodiment 370 of the present invention is given in FIG. 6. This chain, an improvement on a chain such as the one illustrated in FIG. 2, is a three-link endless loop chain, skewed with a stepped pattern. "Skewed" means that the links 375,380 from adjacent pins 385,390 mesh with or straddle each other. This allows the distance between pin centers (pitch) to be reduced. The chain, typically made of hardened steel, is twenty-four thin links 375 wide (counting robust links 380 again as double width), it has a center axis 377, and it further comprises a plurality of elongated pins 385. Each pin has two ends terminating in pressure reception areas 387. A weld spot 389 is added to the pin 385 at each end to prevent it from sliding out. The pin 385 is preferably comprised of two rockers 391,393 that pivot on each other.

The chain further comprises a plurality of thin links 375 and robust links 380, each link further comprising two faces 397 parallel to the center axis 377, each link fashioned with two spaced holes 399, preferably elliptical, with axes perpendicular to the faces 397. The links are pivotally connected in stacks 400 and in overlapping series 402 by the pins 385 fitted though the holes 399. The pins 385 extend past the links 375 so that the ends, which terminate in pressure reception areas 387, can connect frictionally to the pulleys 110,120.

Figure 7:
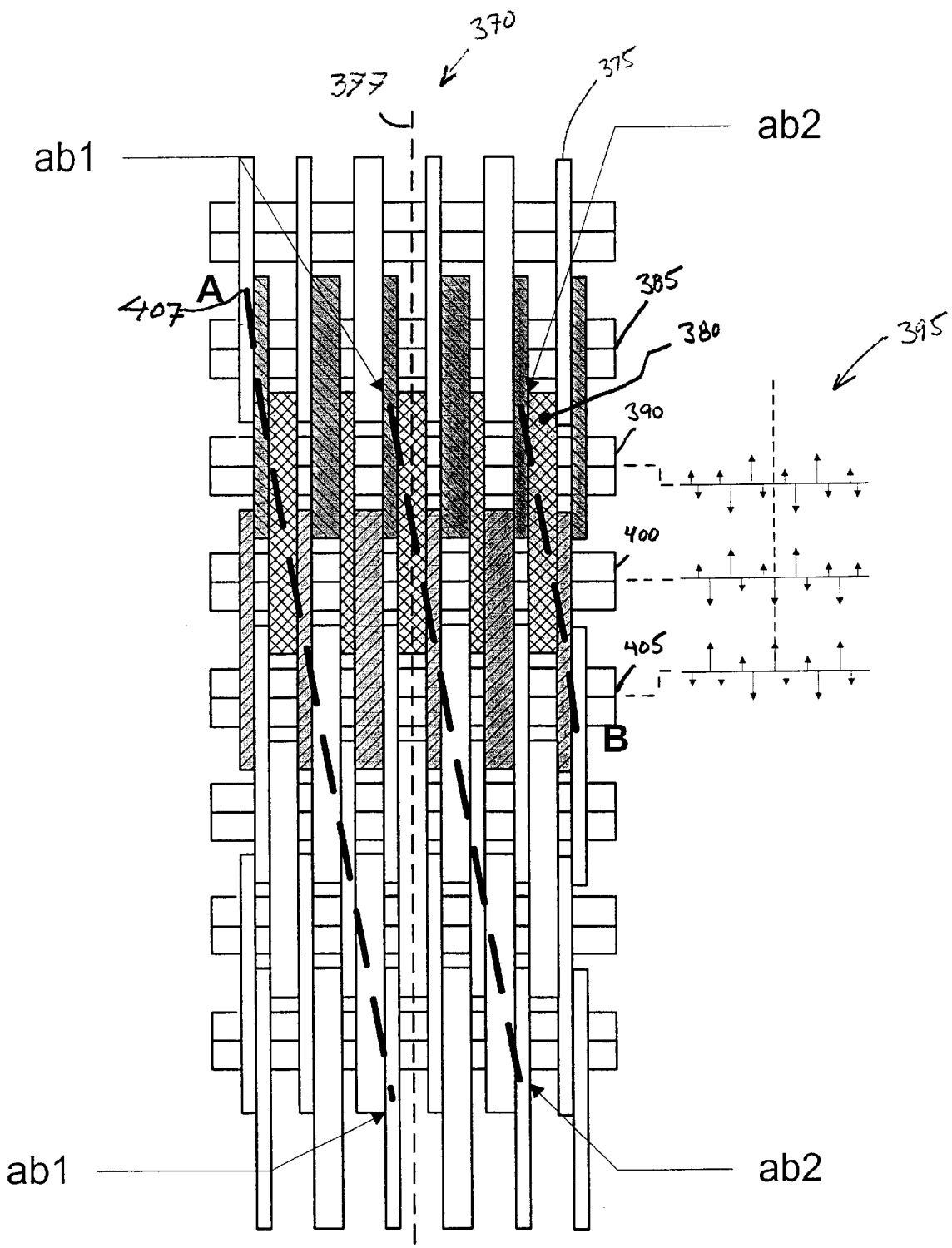
FIG. 7 is an orthographic projection of a section of the chain of FIG. 6, including a corresponding diagram in which is illustrated the estimated tension vectors for each link on three chain pins.

Looking closely at FIG. 7, an orthographic projection of the chain 370 of FIG. 6, reveals that only eight thin links 375 (or a combination of thin and robust links 375,380, where robust links count for simplicity as two thin links) carry the tension between any set of adjacent pins 385,390. As with FIG. 5, robust links 380 being illustrated for simplicity in FIG. 7 as comprising two thin links is not be construed as limiting the present invention in any way. Again, as stated before, robust links may be made in any one or more of the following three ways: they may be made of material of greater tensile strength, they may be formed by mating at least two thin links 375, and/or they may be made of thicker material. Unlike the prior art of FIG. 2, the robust links 380 in the chain 370 of FIG. 7 are distributed throughout the chain. To the right of the chain 370 in FIG. 7 is shown an estimated tension diagram 395. The diagram covers three successive pins 390,400,405 when the chain is in the unclamped space 195 shown in FIG. 1. The tension vectors can be used as discussed hereinbefore to compute minimal pin bending and induced moments.

Modeling the chain 370 of FIGS. 6 and 7 with a finite element analysis (FEA) program while assuming that the chain is clamped between the pulleys 110,120 shows more evenly balanced loading of the outer links 375 than in the chains disclosed in U.S. Pat. No. 4,927,404. The chain 370 also produces more evenly balanced loading of the pins because of the placement of both thin and robust links 375,380. A line AB, 407, broken into line segments A-ab1, then ab1-ab2, and finally ab2-B, can be drawn across the chain. The line 407 could be drawn as unbroken if a longer section of chain were illustrated, but then the link structure would be less apparent. The pattern of the chain 370 in FIG. 7 is arranged, stepping from pin to pin, diagonally along line 407 across the chain, as follows:

1,1,2,1,2,1,2,1,2,1,2,1,2,1,2,1,1 where "1" refers to a thin link 375 and "2" refers to a robust link 380. This thin and robust link arrangement avoids having certain links experience excessive loads because they are segregated from other links and not supported. This segregation causes those links to carry more than their share of the chain tension, causing higher stress in the segregated links.

One skilled in the art may be familiar with finite element analysis (FEA). In that process, a structure is approximated by "finite" elements, such as beams, bars, or plates. The structure is broken into nodal points. The process then connects these points with the finite elements (beams, bars, etc.) that best approximate the actual structure. The process applies loads at the nodal points. Loads may also be applied on the elements, which then distribute the loads to the nodal points. Constraints are also applied to the nodal points to fix the structure being analyzed. The finite element process then assembles all the data into a plurality of simultaneous linear equations. Finally, the process solves for the unknown displacements and then for internal loads and stresses.

A portion of the chain 370 illustrated in FIG. 6 was subjected to stress analysis by a FEA, which is more accurate than the tension vector method described hereinbefore. The FEA was used to determine chain tension, which is proportional to torque-carrying capacity, based on the stresses that the link material can withstand. The torque-carrying capacity of a chain multiplied by the pulley speed equals the power transmitted.

The conclusion is that the stress on a link 375 versus other links in the chain 370 is more nearly equalized than the stress on the links of the prior art, such as FIG. 2. The chain 370 has only eight thin links 375 carrying the tension between any set of adjacent pins. When it is used in a transmission, this chain has at least 10% higher torque-carrying capacity than the chain shown in FIG. 2, which has ten links carrying the tension. Improved link placement thus results in higher torque-carrying capacity with fewer links, leading to better load distribution among the links.

It may be understood by one with ordinary skill in the art that this chain may be used on equipment other than continuously variable transmissions in aircraft. The invention may be used on land-based transmissions. In fact, it may be used on any rotating machinery to transfer torque. The invention may be made of materials other than steel. Furthermore, it may be understood that this design may be used on relatively smaller as well as larger equipment.

All of the foregoing changes are irrelevant. It suffices for the present invention that an endless loop chain having a central axis comprises a plurality of elongated pins; the chain also comprises a plurality of links, each link further comprising two faces parallel to the center axis, each link fashioned with two holes perpendicular to the faces, wherein the links are pivotally connected in stacks and in overlapping series by the pins fitted though the holes, and wherein thick, robust and thin, ordinary links are arranged in the direction perpendicular to the faces, placing robust links throughout the chain in a pattern that balances link stresses and pin moments as nearly equally as possible uses ordinary or "thin" links and "robust" links that are staggered in a diagonal pattern, stepping from pin to pin, across the chain as follows:

1,1,2,1,2,1,2,1,2,1,2,1,2,1,2,1,1 where "1" refers to a thin link and "2" refers to a robust link.

I claim:

1. An endless loop chain having a center axis, comprising:
   a plurality of pins; and
   a plurality of robust links and a plurality of thin links, each of the robust links and each of the thin links further comprising two faces parallel to the center axis and having two spaced holes with axes perpendicular to the two faces, wherein all of the plurality of both the thin links and the robust links being pivotally connected in stacks and in overlapping series by the pins fitted though the holes, wherein the robust links are distributed evenly throughout the chain in a direction perpendicular to the center axis of the chain.

2. The endless loop chain of claim 1, wherein each of the robust links is made of material of greater tensile strength than any of the plurality of thin links.

3. The endless loop chain of claim 1, wherein each of the robust links is made by placing at least two of the thin links adjacent each other.

4. The endless loop chain of claim 1, wherein each of the robust links is thicker than each of the thin links.

5. The endless loop chain of claim 1, such that, staggered in a diagonal pattern and stepping from pin to pin across the chain, the plurality of thin links and the plurality of robust links are stacked as follows:

1,1,2,1,2,1,2,1,2,1,2,1,2,1,2,1,1 where "1" refers to a thin link and "2" refers to a robust link.

6. The endless loop chain of claim 5, wherein the chain connects at least two cone pulleys of a transmission, the pulleys including opposed, variable-spaced cones on shafts, the cones having opposing faces, and the pin ends frictionally transferring torque between the opposing faces of the cones.

7. The endless loop chain of claim 6, wherein the transmission is a continuously variable transmission.

8. The endless loop chain of claim 1, such that, along a line generally perpendicular to the center axis that zigzags from a first to a second adjacent pin and back, the plurality of thin links and the plurality of robust links are stacked as follows:

1, 2, 2, 1, 1, 2, 1, 1, 1, 1, 2, 1, 1, 2, 2, 1 where "1" refers to a thin link and "2" refers to a robust link.

9. The endless loop chain of claim 8, wherein the chain connects at least two cone pulleys of a transmission, the pulleys including opposed, variable-spaced cones on shafts, the cones having opposing faces, the pin ends frictionally transferring torque between the opposing faces of the cones.

10. The endless loop chain of claim 9, wherein the transmission is a continuously variable transmission.

* * * * *